United States Patent
Levy et al.

(10) Patent No.: US 11,138,177 B2
(45) Date of Patent: Oct. 5, 2021

(54) EVENT PROCESSING SYSTEM

(71) Applicant: Huawei Technologies Co., Ltd., Shenzhen (CN)

(72) Inventors: Eliezer Levy, Munich (DE); Aharon Avitzur, Munich (DE); Lucas Braun, Munich (DE); Thomas Etter, Munich (DE); Georgios Gasparis, Munich (DE); Martin Kaufmann, Munich (DE); Donald Kossmann, Munich (DE); Daniel Widmer, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 528 days.

(21) Appl. No.: 15/282,262

(22) Filed: Sep. 30, 2016

(65) Prior Publication Data

US 2017/0017676 A1 Jan. 19, 2017

Related U.S. Application Data (63) Continuation of application No. PCT/EP2014/056425, filed on Mar. 31, 2014.

(51) Int. Cl.
*G06F 16/00* (2019.01)
*G06F 16/23* (2019.01)
(Continued)

(52) U.S. Cl.
CPC ........ *G06F 16/23* (2019.01); *G06F 16/24568* (2019.01); *G06F 16/27* (2019.01)

(58) Field of Classification Search
None
See application file for complete search history.

(56) References Cited

U.S. PATENT DOCUMENTS

2007/0136384 A1 6/2007 Hepper et al.
2009/0106189 A1 4/2009 Jain et al.
(Continued)

FOREIGN PATENT DOCUMENTS

CN 102591645 A 7/2012
CN 102930046 A 2/2013
(Continued)

OTHER PUBLICATIONS

Foreign Communication From a Counterpart Application, Russian Application No. 2016142579, Russian Decision of Grant dated Jun. 27, 2018, 9 pages.

(Continued)

*Primary Examiner* — Debbie M Le
(74) *Attorney, Agent, or Firm* — Conley Rose, P.C.

(57) ABSTRACT

An event processing system is configured to process a stream of events operating on a database system. The event processing system comprises an event load balancing unit, a plurality of event computing nodes, and a plurality of event state stores, wherein the event load balancing unit is configured to route the stream of events to the plurality of event computing nodes, wherein the plurality of event state stores are configured to store states of the plurality of event computing nodes for maintaining a state of the event processing, and wherein the plurality of event computing nodes are configured to process the events, to change their states, and to update the plurality of event state stores based on their changed states.

20 Claims, 2 Drawing Sheets

(51) Int. Cl.
  *G06F 16/27* (2019.01)
  *G06F 16/2455* (2019.01)

(56) References Cited

U.S. PATENT DOCUMENTS

| | | | |
|---|---|---|---|
| 2010/0229178 | A1 | 9/2010 | Ito |
| 2011/0087731 | A1 | 4/2011 | Wong et al. |
| 2011/0321057 | A1 | 12/2011 | Mejdrich et al. |
| 2012/0159516 | A1 | 6/2012 | Villadsen et al. |
| 2012/0291049 | A1* | 11/2012 | Park ............. G06F 9/5027 719/318 |
| 2012/0297237 | A1* | 11/2012 | Chatterjee ......... G06F 17/3056 714/4.1 |
| 2013/0226909 | A1 | 8/2013 | Katsunuma et al. |

FOREIGN PATENT DOCUMENTS

| | | |
|---|---|---|
| EP | 2770447 B1 | 6/2016 |
| JP | 2007164794 A | 6/2007 |
| JP | 2010204880 A | 9/2010 |
| RU | 2534953 C2 | 12/2014 |
| WO | 2012046316 A1 | 4/2012 |
| WO | 2013145310 A1 | 10/2013 |

OTHER PUBLICATIONS

Foreign Communication From a Counterpart Application, Russian Application No. 2016142579, English Translation of Russian Decision of Grant dated Jun. 27, 2018, 7 pages.
Wikipedia, "StreamSQL," http://en.wikipedia.org/wiki/StreamSQL, Sep. 15, 2017, 2 pages.
Babcock, B., et al., "Models and Issues in Data Stream Systems," Proceedings of the twenty-first ACM SIGMOD-SIGACT-SIGART Symposium on Principles of database system, Jun. 3-5, 2002, 30 pages.
Krishnamurthy, S., et al., "TelegraphCQ: An Architectural Status Report," Jan. 2003, 8 pages.
Balakrishnan, H., et al., "Retrospective on Aurora," The VLDB Journal Manuscript, vol. 13, No. 4, Dec. 2004, 16 pages.
Abadi, D., et al., "The Design of the Borealis Stream Processing Engine," Second Biennial Conference on Innovative Data Systems Research, Jan. 2005, 13 pages.
Peng, D., et al., Large-scale Incremental Processing Using Distributed Transactions and Notifications, Jan. 2010, 14 pages.
"Storm," Oct. 19, 2017, 2 pages.
Larson, P., et al., "The Hekaton Memory-Optimized OLTP Engine," 2013, pp. 34-40.
Stonebraker, M., "One Size Fits All: An Idea Whose Time has Come and Gone," Proceedings of the 21st International Conference on Data Engineering, Apr. 5-8, 2005, 10 pages.
Widom, J., et al., "Introduction to Active Database Systems," 1996, 30 pages.
Wikipedia, "InfiniBand," Oct. 14, 2017, 4 pages.
Stoica, I., et al., "Chord: A Scalable Peer-to-peer Lookup Protocol for Internet Applications," 2003, 14 pages.
Rowstron, A., et al., "Pastry: Scalable, Decentralized Object Location and Routing for Large-scale Peer-to-peer Systems," Proceedings of the 17th IFIP/ACM International Conference on Distributed Systems Platforms, 2001, 22 pages.
Ousterhout, J., et al., "The Case for RAMClouds: Scalable High-Performance Storage Entirely in DRAM," SIGOPS Operating Systems Review, vol. 43, No. 4, Dec. 2009, 14 pages.
Sybase "Complex Event Processing: Ten Design Patterns," XP055154353, Oct. 30, 2010, 23 pages.
Nagy, K., "Distributing Complex Event Detection," XP055154133, Jun. 30, 2012, 129 pages.
Walker, M., "Lambda Architecture for Big Data Systems," XP055154043, Data Science Central, Dec. 4, 2013, 7 pages.
Foreign Communication From a Counterpart Application, PCT Application No. PCT/EP2014/056425, English Translation of International Search Report dated Dec. 10, 2014, 5 pages.
Foreign Communication From a Counterpart Application, PCT Application No. PCT/EP2014/056425, English Translation of Written Opinion dated Dec. 10, 2014, 10 pages.
Machine Translation and Abstract of International Publication No. WO2013145310, Oct. 3, 2013, 36 pages.
Nishizawa, S., "Monitoring and Processing Large Amount of Data Real time," Complex Event Processing (CEP), IT architect, Japan, May 28, 2009, vol. 23., 15 pages.
English Translation of Nishizawa, S., "Monitoring and Processing Large Amount of Data Real time," Complex Event 3Processing (CEP), IT architect, Japan, May 28, 2009, vol. 23., 13 pages.
Katsunuma, S., et al., "Distributed and Parallel Stream Data Processing for Reducing Merge Operation Overhead," 2nd forum regarding data engineering and information management—DEIM 2010—collected papers, Japan, May 25, 2010, 9 pages.
English Translation of Katsunuma, S., et al., "Distributed and Parallel Stream Data Processing for Reducing Merge Operation Overhead," 2nd forum regarding data engineering and information management—DEIM 2010—collected papers, Japan, May 25, 2010, 9 pages.
Foreign Communication From a Counterpart Application, Chinese Application No. 2016-559816, Chinese Office Action dated Nov. 14, 2017, 6 pages.
Foreign Communication From a Counterpart Application, Chinese Application No. 2016-559816, English Translation of Chinese Office Action dated Nov. 14, 2017, 7 pages.
Foreign Communication From a Counterpart Application, Chinese Application No. 2014800772560, Chinese Search Report dated Jan. 12, 2019, 2 pages.
Foreign Communication From a Counterpart Application, Chinese Application No. 2014800772560, Chinese Office Action dated Jan. 24, 2019, 7 pages.
Zi-Yu, L., et al., "Research on Cloud Databases," Journal of Software, 2012, 19 pages.

* cited by examiner

EVENT PROCESSING SYSTEM

CROSS-REFERENCE TO RELATED APPLICATION

This application is a continuation of International Application No. PCT/EP2014/056425, filed on Mar. 31, 2014, the disclosure of which is hereby incorporated by reference in its entirety.

TECHNICAL FIELD

The present disclosure relates to an event processing system and a method for event processing. The disclosure further relates to scalable stream processing combined with real-time analytics for database management systems (DBMS), in particular DBMS using Structured Query Language (SQL).

BACKGROUND

In large scale data processing, the three important features that are high volume stateful event processing, real-time analytics with complex declarative queries (e.g., SQL queries) and scalability in the workload, i.e. number of queries and events, and database size are critical for a number of applications. As an example, a telecommunication operator may need to capture and process up to millions of call records per second and provide support to analyze the behavior of its customers with complex ad-hoc queries. State-of-the-art database technology can address at best two of these three features. More specifically, there are two classes of systems: (a) Data Stream Management Systems (DSMS) and (b) DBMS. DSMS are a good match for complex event processing, but do not support real-time analytics. The most advanced DBMS support (at best) real-time analytics, but are not a good fit for complex event processing. Both kinds of systems often have limited scalability.

The objective of a DSMS is to track in real time a high bandwidth stream of discrete events. State-of-the-art systems provide a declarative interface using extension of the SQL query language such as StreamSQL. Using StreamSQL, application developers define rules (also referred as continuous queries) that specify possibly complex patterns on the input stream of events. Whenever the input stream of events exposes such a pattern, the rule fires and produces a result that is consumed by the application as a stream of events.

In order to perform its function, a DSMS must maintain a potentially very large number of state variables that are needed in order to evaluate the rules. In principle, upon arrival of every event, the DSMS must update the relevant state variables and check whether the new global state requires triggering a pre-specified rule. The relevant computation amounts to calculating the new values and updating these state variables; whereas, the relevant storage amounts to maintaining the state variables such that the frequent computation of new values can be done in real-time.

Modern DSMS can process up to hundred thousands of events per second and hundreds of rules on a standard single machine. They do this by applying a number of optimizations. Most specifically, they internally optimize the management of the state variables specifically for the given set of rules. To scale with the number of machines, these systems replicate the stream of events and process different rules on different machines. That is, they replicate the data and partition the workload. The design of these systems is based on research carried out in the context of the Stream project according to "Brian Babcock, Shivnath Babu, Mayur Datar, Rajeev Motwani, Jennifer Widom: Models and Issues in Data Stream Systems. PODS 2002: 1-16", the Telegraph project according to "Sailesh Krishnamurthy, Sirish Chandrasekaran, Owen Cooper, Amol Deshpande, Michael J. Franklin, Joseph M. Hellerstein, Wei Hong, Samuel Madden, Frederick Reiss, Mehul A. Shah: TelegraphCQ: An Architectural Status Report. IEEE Data Eng. Bull. 26(1): 11-18 (2003)" and the Aurora/Borealis projects according to "Hari Balakrishnan, Magdalena Balazinska, Donald Carney, Ugur cetintemel, Mitch Cherniack, Christian Convey, Eduardo F. Galvez, Jon Salz, Michael Stonebraker, Nesime Tatbul, Richard Tibbetts, Stanley B. Zdonik: Retrospective on Aurora. VLDB J. 13(4): 370-383 (2004)" and "Daniel J. Abadi, Yanif Ahmad, Magdalena Balazinska, Ugur cetintemel, Mitch Cherniack, Jeong-Hyon Hwang, Wolfgang Lindner, Anurag Maskey, Alex Rasin, Esther Ryvkina, Nesime Tatbul, Ying Xing, Stanley B. Zdonik: The Design of the Borealis Stream Processing Engine. CIDR 2005: 277-289".

The design of a modern DSMS makes it work well for the specific applications that they were designed for, but makes them inappropriate to support real-time analytics. By encapsulating all state variables and tuning the storage of the state variables specifically for the rules, it becomes virtually impossible to process any ad-hoc queries on the data. Consequently, none of the modern DSMS have sufficient real-time analytics capabilities. The "replicate data-partition workload" principle limits the scalability of these systems. If the data rate grows beyond the capability of a single machine, these systems can no longer sustain the workload.

To overcome the scalability problems of modern DSMS, the Percolator system according to "Daniel Peng, Frank Dabek: Large-scale Incremental Processing Using Distributed Transactions and Notifications. OSDI 2010: 251-264" was developed as a proprietary system of the GOOGLE company. The Percolator system provides a flexible programming framework for distributed and scalable stream and complex event processing. With Percolator, application developers can choose to follow a "partition data-partition workload" model to achieve better data scalability. However, Percolator does not provide any declarative mechanism to support rules and continuous queries. Furthermore, Percolator does not provide any support for real-time analytics. Following most of the Percolator design principles, the Storm system was developed as an open-source system by the TWITTER company.

As an alternative to DSMS, it is theoretically possible to use a modern DBMS to process streams of events and carry out ad-hoc real-time analytics queries. In this approach, each event is posted as a transaction to the DBMS. Ad-hoc queries can then be executed by the same DBMS. Modern, main-memory database systems such as "Hekaton" according to "Per-Ake Larson, Mike Zwilling, Kevin Farlee: The Hekaton Memory-Optimized OLTP Engine. IEEE Data Eng. Bull. 36(2): 34-40 (2013)" can process hundreds thousands of simple transactions (such as inserting an event) per second on a single machine. Furthermore, they can scale by partitioning the data across several nodes. However, their support for ad-hoc queries is limited because, again, the internal data structures of such high-end transaction processing systems are specifically tuned to process many small transactions for data ingress. Furthermore, these systems typically provide no support for queries that involve data stored on several machines. Even worse, these systems provide absolutely no support for the processing of rules and continuous queries. Again, this deficiency is intrinsic to their architecture and was the key motivation for the development of DSMS in the first place as described by "Michael Stonebraker: Technical perspective—One size fits all: an idea whose time has come and gone. Commun. ACM 51(12): 76 (2008)". At best, these systems support so-called triggers which fire when a certain event occurs (see "Jennifer Widom, Stefano Ceri: Introduction to Active Database Systems. Active Database Systems: Triggers and Rules For Advanced Database Processing 1996: 1-41"), but such triggers are not able to detect the complex patterns that are typically found in the rules of complex event processing applications.

SUMMARY

It is the object of the disclosure to provide a technique for improved event processing providing high volume stateful event processing, real-time analytics with complex declarative queries and scalability in the workload and database size.

This object is achieved by the features of the independent claims. Further implementation forms are apparent from the dependent claims, the description and the figures.

The invention as described in the following is based on the fundamental observation that there are two key points for providing an improved event processing system that are separation of the logic and the state of the event processing and the structuring of the state as an analytics matrix (AM) and the possibility to add query processing capabilities on the separate state for the purposes of real-time analytics.

Since the state and the logic of the stream processing system may not be coupled, it may be possible to scale the system in a systematic scale-out manner. Scaling out is relatively simple and streamlined, since the update of the AM may be by key and the AM may be partitioned by key. In addition, the stateless logic and rule index may be replicated for scale. No state-of-the-art DSMS can demonstrate the resulting scalability. Likewise, the storage layer may be scaled separately with the size of the data and/or the workload requirements.

If the state of the stream processing sub-system is maintained in a main-memory database system (as opposed to a distributed key-value store), it may be used for query processing on the fresh data satisfying the requirements for real-time analytics. In any case, the real-time analytics layer may scale with the workload in the same way as the stream processing layer; nodes may be added and removed at any point of time to deal with an increasing or decreasing workload.

In the following, a mechanism called the AM is described for maintaining the state of event processing in a special dedicated storage. The state variables may be stored in a distributed, main-memory based key-value store. Furthermore, a separate tier of processing nodes is described to handle rules and continuous queries for complex event processing. A further separate tier of processing nodes is described to handle ad-hoc queries for real-time analytics.

In order to describe the invention in detail, the following terms, abbreviations and notations will be used:
AM: Analytics Matrix.
DBMS: database management system.
DSMS: data stream management system.
SQL: Structured Query Language.
SEP: Stream and Event Processing System.
RTA: real-time analytics system.
AIM: Analytics in Motion.
ETL: Extract, Transform, Load.
CRM: Customer Relationship Management.

DBMSs are specially designed applications that interact with the user, other applications, and the database itself to capture and analyze data. A general-purpose DBMS is a software system designed to allow the definition, creation, querying, update, and administration of databases. Different DBMSs can interoperate by using standards such as SQL and Open Database Connectivity (ODBC) or JAVA Database Connectivity (JDBC) to allow a single application to work with more than one database.

A DSMS is a computer program to manage continuous data streams. It is similar to a DBMS, which is, however, designed for static data in conventional databases. A DSMS also offers a flexible query processing so that the information need can be expressed using queries. However, in contrast to a DBMS, a DSMS executes a continuous query that is not only performed once, but is permanently installed. Therefore, the query is continuously executed until it is explicitly uninstalled. Since most DSMS are data-driven, a continuous query produces new results as long as new data arrive at the system. This basic concept is similar to Complex event processing so that both technologies are partially coalescing.

Event Processing, Event Computing.

Event processing is a method of tracking and analyzing (processing) streams of information (data) about things that happen (events), and deriving a conclusion from them. Complex event processing (CEP) is event processing that combines data from multiple sources to infer events or patterns that suggest more complicated circumstances. The goal of complex event processing is to identify meaningful events (such as opportunities or threats) and respond to them as quickly as possible.

SQL is a special-purpose programming language designed for managing data held in a relational database management system (RDBMS).

Originally based upon relational algebra and tuple relational calculus, SQL consists of a data definition language and a data manipulation language. The scope of SQL includes data insert, query, update and delete, schema creation and modification, and data access control.

InfiniBand is a switched fabric computer network communications link used in high-performance computing and enterprise data centers. Its features include high throughput, low latency, quality of service and failover, and it is designed to be scalable. The InfiniBand architecture specification defines a connection between processor nodes and high performance input/output (I/O) nodes such as storage devices.

According to a first aspect, the invention relates to an event processing system configured to process a stream of events operating on a database system, the event processing system comprising an event load balancing unit, a plurality of event computing nodes and a plurality of event state stores which are separated from the event computing nodes, wherein the event load balancing unit is configured to route the stream of events to the plurality of event computing nodes according to an event load balancing criteria; wherein the plurality of event state stores are configured to store states of the plurality of event computing nodes for maintaining a state of the event processing; and wherein the plurality of event computing nodes are configured to process the events received from the event load balancing unit, to change their states in accordance to the processing of the events and to update the plurality of event state stores based on their changed states.

The separation of the event state stores from the event computing nodes provides scalable stream processing. A stateful stream processing, i.e. stream processing being aware of its internal states, may be realized in a scalable manner.

Scaling stateful stream processing allows the event processing system to withstand very high event rates. Combining the capabilities of real time analytics, e.g. by SQL, with stateful stream processing in a single system allows to reduce total cost and complexity of the system.

The event computing node is not associated with a respective state node. The separation/decoupling between state and computing allows any computing node to process any incoming event. Upon an incoming event the computing node can access transparently any state store in order to fetch the current state. By that the event processing system is scalable and balanced because any computing node can handle any incoming event and can access any state on one of the state stores.

The event processing system thus provides a fast-enough separate state store to handle mass event streams in a decent performance with respect to throughput and response time.

By introducing that separation various consumers in the real-time query domain are facilitated to query this consolidated state store with any kind of complex analytic query.

In a first possible implementation form of the event processing system according to the first aspect, the event processing system further comprises a query load balancing unit and a plurality of query processing nodes, wherein the query load balancing unit is configured to route a stream of queries to the plurality of query processing nodes according to a query load balancing criteria; wherein the plurality of query processing nodes are configured to process the queries received from the query load balancing unit.

The separation of the event state stores from the event computing nodes provides scalable stream processing combined with Real-Time Analytics.

In a second possible implementation form of the event processing system according to the first implementation form of the first aspect, the query load balancing unit is configured to forward each query to exactly one query processing node.

When forwarding each query to exactly one query processing node, only that processing node is busy such that the efficiency of the system is improved.

In a third possible implementation form of the event processing system according to the first or the second implementation form of the first aspect, a query processing node of the plurality of query processing nodes is configured to access at least one event state store of the plurality of event state stores for processing the query received from the query load balancing unit.

When the query processing node accesses at least one event state store, it may increase its response time for processing the query.

In a fourth possible implementation form of the event processing system according to the third implementation form of the first aspect, the query processing node is configured to access further data, in particular customer master data of the database system for processing the query.

When accessing further data such as customer master data of the database system, the accuracy for processing the query is improved.

In a fifth possible implementation form of the event processing system according to the first aspect as such or according to any of the preceding implementation forms of the first aspect, the plurality of query processing nodes are configured to handle ad-hoc queries for real-time analytics.

When ad-hoc queries are handled, the event processing system is able to perform real-time analytics.

In a sixth possible implementation form of the event processing system according to the first aspect as such or according to any of the preceding implementation forms of the first aspect, the plurality of event state stores comprises a distributed main-memory based key-value store.

A distributed main-memory allows faster access times and thus speeds up the event processing system.

In a seventh possible implementation form of the event processing system according to the first aspect as such or according to any of the preceding implementation forms of the first aspect, the plurality of event computing nodes are configured to handle rules and continuous queries for complex event processing together with the event processing at the same time in real-time.

The event processing system therefore enables real time query analytics with scalable event processing in the same system at the same time.

In an eighth possible implementation form of the event processing system according to the first aspect as such or according to any of the preceding implementation forms of the first aspect, the event load balancing unit is configured to route the events based on application-defined partitioning, in particular based on a customer key, and rule replication.

Routing the events based on application-defined partitioning allows fast routing of the events and so allows the system to be highly efficient.

In a ninth possible implementation form of the event processing system according to the first aspect as such or according to the eighth implementation form of the first aspect, the event load balancing unit is configured to route the events such that an event computing node of the plurality of event computing nodes handles a particular subset of the events and processes all rules on the particular subset of the events.

When an event computing node handles a particular subset of the events, the complexity of the individual computing nodes can be reduced thus reducing the overall complexity of the event processing system.

In a tenth possible implementation form of the event processing system according to the first aspect as such or according to any of the first to the seventh implementation forms of the first aspect, the event load balancing unit is configured to route the events based on event replication and rule partitioning such that every event computing node handles all events and a sub-set of rules.

When every event computing node handles all events and a sub-set of rules, the software for each event computing node can be the same thereby allowing reduction of development complexity.

In an eleventh possible implementation form of the event processing system according to the first aspect as such or according to any of the first to the seventh implementation forms of the first aspect, the event load balancing unit is configured to route the events based on round-robin partitioning of the events and replication of rules such that an event computing node of the plurality of event computing nodes handles an event when it has free capacity.

When routing the events based on round-robin partitioning, all events may be processed in about the same time delay.

In a twelfth possible implementation form of the event processing system according to the first aspect as such or according to any of the first to the seventh implementation forms of the first aspect, the event load balancing unit is configured to route the events based on partitioning and replication of the events and rules through the plurality of event computing nodes.

Routing the events based on partitioning and replication of the events and rules allows describing the system by simple rules.

According to a second aspect, the invention relates to a method for event processing, the method comprising: routing a stream of events to a plurality of event computing nodes according to an event load balancing criteria; storing states of the plurality of event computing nodes in a plurality of event state stores which are separated from the event computing nodes for maintaining a state of the event processing; and processing the received events in the plurality of event computing nodes, changing states of the plurality of event computing nodes in accordance to the processing of the events and updating the states of the plurality of event computing nodes in the plurality of event state stores.

By separating the events' state store from the events' computing nodes, the method is able to process a higher rate of stream events per second, i.e. the throughput is increased.

According to a third aspect, the invention relates to a computer program product comprising a readable storage medium storing program code thereon for use by a computer, the program code comprising: instructions for routing a stream of events to a plurality of event computing nodes according to an event load balancing criteria; instructions for storing states of the plurality of event computing nodes in a plurality of event state stores which are separated from the event computing nodes; and instructions for processing the received events in the plurality of event computing nodes, for changing states of the plurality of event computing nodes in accordance to the processing of the events and for updating the states of the plurality of event computing nodes in the plurality of event state stores.

The separation of the event state stores from the event computing nodes provides scalable stream processing. Scaling stateful stream processing allows the event processing system to withstand very high event rates. Combining the capabilities of real time analytics with stateful stream processing in a single system allows reducing total cost and complexity of the system. The computer program can be flexibly designed such that an update of the requirements is easy to achieve. The computer program product may run on an event processing system as described hereinafter.

Aspects of the invention thus provide a technique for improved event processing providing high volume stateful event processing, real-time analytics with complex declarative queries and scalability in the workload and database size.

BRIEF DESCRIPTION OF THE DRAWINGS

Further embodiments of the invention will be described with respect to the following figures, in which.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The devices and methods described herein may be based on event computing nodes and event state stores. It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless noted otherwise.

The methods and devices described herein may be implemented in data base management systems, in particular DBMS using SQL. The described devices and systems may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

Figure 1:
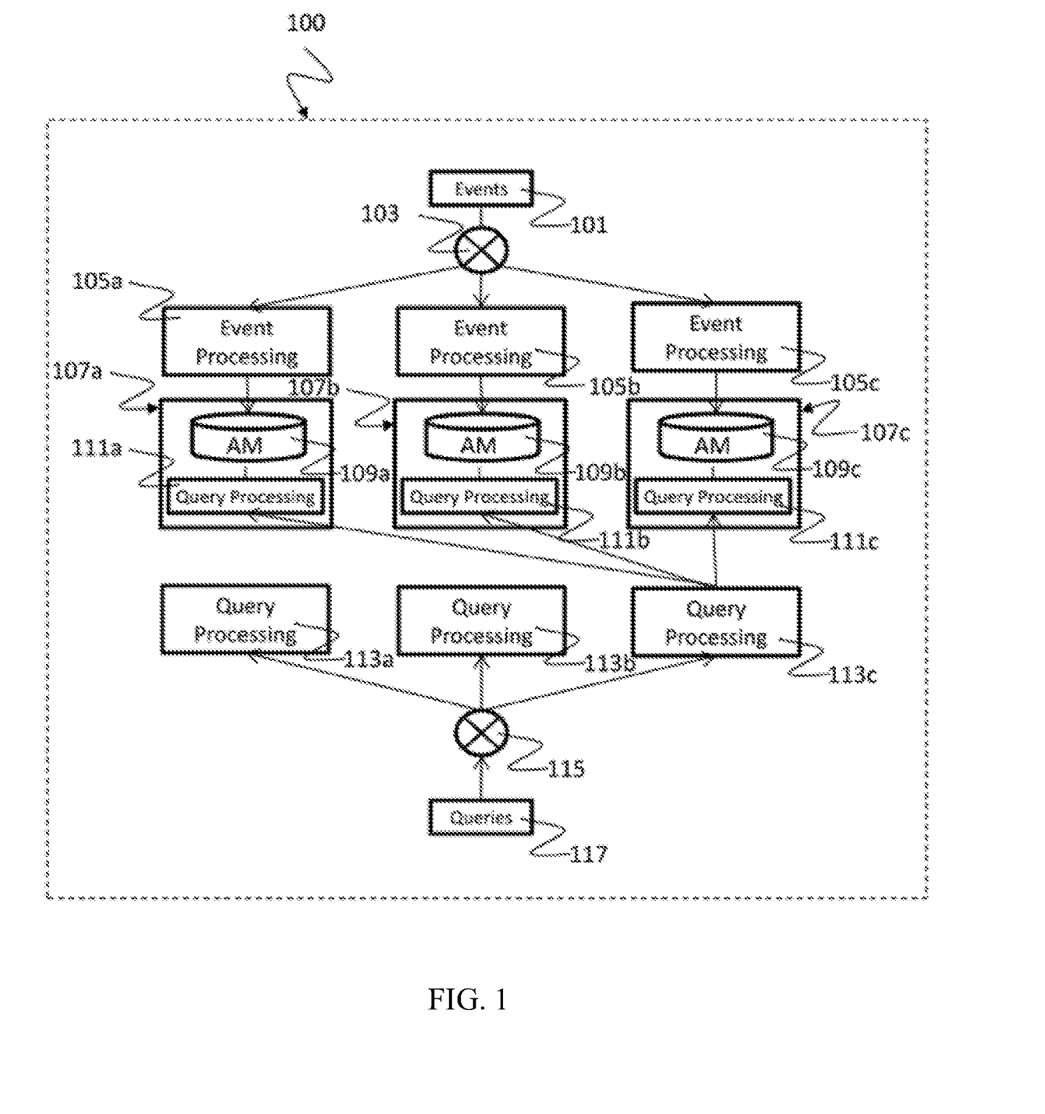
FIG. 1 shows a block diagram illustrating an event processing system according to an implementation form.

FIG. 1 shows a block diagram illustrating an event processing system 100 according to an implementation form. The event processing system 100 may process a stream of events 101 operating on a database system. The event processing system 100 may include an event load balancing unit 103, a plurality of event computing nodes 105*a*, 105*b*, 105*c* and a plurality of event state stores 109*a*, 109*b*, 109*c* which are separated from the event computing nodes 105*a*, 105*b*, 105*c*. The event load balancing unit 103 may route the stream of events 101 to the plurality of event computing nodes 105*a*, 105*b*, 105*c* according to an event load balancing criteria. The plurality of event state stores 109*a*, 109*b*, 109*c* may store states of the plurality of event computing nodes 105*a*, 105*b*, 105*c* for maintaining a state of the event processing. The plurality of event computing nodes 105*a*, 105*b*, 105*c* may process the events 101 received from the event load balancing unit 103, to change their states in accordance to the processing of the events and to update the plurality of event state stores 109*a*, 109*b*, 109*c* based on their changed states.

The event processing system 100 may further include a query load balancing unit 115 and a plurality of query processing nodes 113*a*, 113*b*, 113*c*. The query load balancing unit 115 may route a stream of queries 117 to the plurality of query processing nodes 113*a*, 113*b*, 113*c* according to a query load balancing criteria. The plurality of query processing nodes 113*a*, 113*b*, 113*c* may process the queries 117 received from the query load balancing unit 115.

In one example, the query load balancing unit 115 may forward each query 117 to exactly one query processing node 113*a*, 113*b*, 113*c*. In one example, a query processing node 113*a*, 113*b*, 113*c* may access at least one event state store of the plurality of event state stores 109*a*, 109*b*, 109*c* for processing the query 117 received from the query load balancing unit 115. In one example, the query processing node 113*a*, 113*b*, 113*c* may access further data, in particular customer master data of the database system for processing the query 117. In one example, the plurality of query processing nodes 113*a*, 113*b*, 113*c* may handle ad-hoc queries for real-time analytics. In one example, the plurality of event state stores 109*a*, 109*b*, 109*c* may include a distributed main-memory based key-value store. In one example, the plurality of event computing nodes 105*a*, 105*b*, 105*c* may handle rules and continuous queries for complex event processing together with the event processing at the same time in real-time. In one example, the event load balancing unit 103 may route the events 101 based on application-defined partitioning, in particular based on a customer key, and rule replication. In one example, the event load balancing unit 103 may route the events 101 such that an event computing node of the plurality of event computing nodes 105*a*, 105*b*, 105*c* handles a particular subset of the events 101 and processes all rules on the particular subset of the events 101. In one example, the event load balancing unit 103 may route the events 101 based on event replication and rule partitioning such that every event computing node 105*a*, 105*b*, 105*c* handles all events 101 and a sub-set of rules. In one example, the event load balancing unit 103 may route the events 101 based on round-robin partitioning of the events 101 and replication of rules such that an event computing node of the plurality of event computing nodes 105*a*, 105*b*, 105*c* handles an event 101 when it has free capacity. In one example, the event load balancing unit 103 may route the events 101 based on partitioning and replication of the events 101 and rules through the plurality of event computing nodes 105*a*, 105*b*, 105*c*.

FIG. 1 depicts the overall architecture. The top tier including the event computing nodes 105*a*, 105*b*, 105*c* may be dedicated to complex event processing. The load balancer, denoted hereinafter as event load balancing unit 103 may take the stream of events 101 as input and may route the events 101 to the processing nodes, denoted hereinafter as event computing nodes 105*a*, 105*b*, 105*c*. The processing nodes 105*a*, 105*b*, 105*c* at this layer may process the rules for complex event processing and may compute the new state of the state variables. They may update the AM stored in the middle tier units 107*a*, 107*b*, 107*b*. The bottom tier units denoted hereinafter as query processing nodes 113*a*, 113*b*, 113*c* may be dedicated to processing ad-hoc queries for real-time analytics. Again, there is a load balancer denoted hereinafter as query load balancing unit 115 that may take a stream of ad-hoc queries 117 as input and may forwards an ad-hoc query 117 to exactly one processing node 113*a*, 113*b*, 113*c* at this tier. This processing node 113*a*, 113*b*, 113*c* may then process this query 117, thereby accessing the AM 109*a*, 109*b*, 109*c* and possibly other dimension data, e.g., customer master data. In an implementation form for high performance, special, distributed query processing techniques may be used for the execution of ad-hoc queries on the AM 109*a*, 109*b*, 109*c*.

Four different variants for load balancing in the stream processing may be implemented: In a first variant, application-defined partitioning of the events (by, e.g., customer key) and replicating of the rules may be applied. That is, a processing node of the stream processing layer may handle a specific subset of all events and may process all rules on this set of events. In a second variant, replicating events and partitioning of rules may be applied. That is, every processing node of the stream processing layer may handle all events but only a sub-set of the rules. In a third variant, round-robin partitioning of events and replicating rules may be applied. That is, a processing node of the stream processing layer may handle an event whenever it has free capacity. In a fourth variant, a hybrid solution may be applied, that is partitioning and replicating events and rules across the processing layer.

Which variant is best depends on characteristics of the application workload. In the first and second variants and certain instantiations of the fourth variant, state variables may be cached by the processing nodes for higher performance. In the third variant, a processing node may read the required state variables from the storage layer for each event.

Experiments have shown that on modern hardware, e.g. InfiniBand networks, even the third variant can perform extremely well. The exact storage layout of the AM may depend on the chosen option for load balancing in the stream processing. In the first variant, state variables may be partitioned by customer key and may be stored on the corresponding node, while in the second and third variants they may be stored on the same node as the rules that may use them.

To achieve high performance of reading and updating the state variables distributed, main memory hashing techniques may be used; e.g., protocols such as those proposed in the Chord and Pastry systems described in "Ion Stoica, Robert Morris, David Liben-Nowell, David R. Karger, M. Frans Kaashoek, Frank Dabek, Hari Balakrishnan: Chord: a scalable peer-to-peer lookup protocol for internet applications. IEEE/ACM Trans. Netw. 11(1): 17-32 (2003)" and "Antony I. T. Rowstron, Peter Druschel: Pastry: Scalable, Decentralized Object Location, and Routing for Large-Scale Peer-to-Peer Systems. Middleware 2001: 329-350". Alternatively, any other main-memory database system may be used (e.g., MICROSOFT'S Hekaton, ORACLE'S Times Ten, or SAP's Hana products). Furthermore, modern, low latency networking techniques such as InfiniBand may be used.

New query processing techniques may be applied to process ad-hoc, real-time analytics queries on top of such distributed, main memory storage systems. For efficient processing of events in the processing nodes of the stream processing layer, special rule compilation techniques may be applied. These techniques may take the special semantics of each state variable into account. For instance, some state variables may be processed fully incrementally; others may need to keep track of some history of changes. The compiler may take advantage of each kind of state variable, thereby minimizing both space and time.

The event processing system 100 may constitute a real-time decision sub-system decision system that may be part of a CRM system of a telecommunications company operator. The sub-system may sustain a mixed workload of concurrent feeds from billing system and several different queries submitted by users of the CRM system. The sub-system may be divided into two parts. First, a Stream and Event Processing System (SEP) that may process and store events in a fashion tailored towards fast evaluation of business rules. Second, a real-time analytics system (RTA) may be used that may evaluate more complicated analytical queries.

The novel approach presented in this disclosure, which is also called "Analytics in Motion (AIM)", does not follow the traditional data warehousing techniques where RTA would be fed by SEP by continuous Extract, Transform, Load (ETL) operations, but may let RTA directly access SEP's storage and thereby may make it able to answer analytical queries in real-time.

The rules processed by SEP may support deciding which kind of product information may be promoted to customer according to specific predicates. The condition of this kind of query may be of high selectivity and aggregation may be frequent. Next, the RTA queries are described. For example, the sub-system may support a query to segment customers into groups to help marketer design and measure campaigns. Full table scan, aggregation and multi-table join may be frequent.

Figure 2:
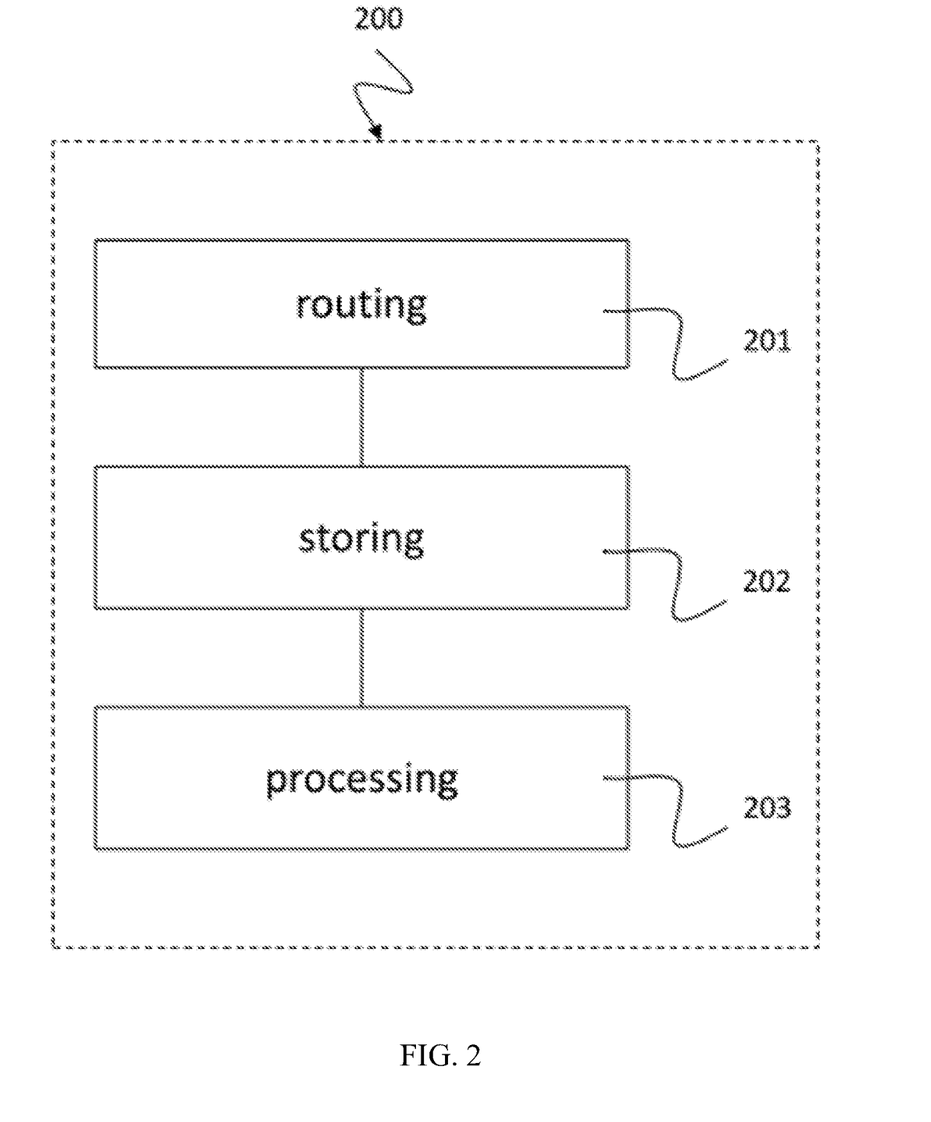
FIG. 2 shows a block diagram illustrating a method for event processing according to an implementation form.

FIG. 2 shows a block diagram illustrating a method 200 for event processing according to an implementation form. The method 200 may include routing 201 a stream of events 101 to a plurality of event computing nodes 105a, 105b, 105c according to an event load balancing criteria (see FIG. 1). The method 200 may include storing 202 states of the plurality of event computing nodes 105a, 105b, 105c in a plurality of event state stores 109a, 109b, 109c which are separated from the event computing nodes 105a, 105b, 105c for maintaining a state of the event processing. The method 200 may include processing 203 the received events 101 in the plurality of event computing nodes 105a, 105b, 105c, changing states of the plurality of event computing nodes 105a, 105b, 105c in accordance to the processing of the events 101 and updating the states of the plurality of event computing nodes 105a, 105b, 105c in the plurality of event state stores 109a, 109b, 109c.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

The present disclosure also supports a computer program product including computer executable code or computer executable instructions that, when executed, causes at least one computer to execute the performing and computing steps described herein, in particular the method 200 as described above with respect to FIG. 2 and the techniques described above with respect to FIG. 1. Such a computer program product may include a readable storage medium storing program code thereon for use by a computer, the program code may include instructions for routing a stream of events to a plurality of event computing nodes according to an event load balancing criteria; instructions for storing states of the plurality of event computing nodes in a plurality of event state stores which are separated from the event computing nodes; and instructions for processing the received events in the plurality of event computing nodes, for changing states of the plurality of event computing nodes in accordance to the processing of the events and for updating the states of the plurality of event computing nodes in the plurality of event state stores.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. An event processing system configured to process a stream of events operating on a database system, comprising:
an event load balancing device;
a plurality of event computing nodes communicatively coupled to the event load balancing device;
a plurality of event state stores communicatively coupled to the event load balancing device and the event computing nodes, wherein the event state stores are separated from and updated by the event computing nodes, wherein the event state stores are configured to store states of the event computing nodes to maintain a state of event processing and be updated with changed states of the event computing nodes, and wherein the event load balancing device is configured to route the stream of events to the event computing nodes according to an event load balancing criteria and the states of the event computing nodes;
a plurality of query processing nodes coupled to the event state stores; and
a query load balancing device coupled to the query processing nodes and configured to route a stream of ad-hoc queries to the query processing nodes according to a query load balancing criteria, wherein the query processing nodes are configured to:
receive the stream of ad-hoc queries from the query load balancing device;
access at least one event state store of the event state stores to process an ad-hoc query of the ad-hoc queries received from the query load balancing device; and
handle the ad-hoc queries for real-time analytics, wherein a real-time analytics (RTA) system is used to directly access the event state stores and handle the ad-hoc queries for the real-time analytics.

2. The event processing system of claim 1, wherein the query load balancing device is further configured to forward each of the ad-hoc queries to exactly one query processing node.

3. The event processing system of claim 1, wherein the query processing nodes are further configured to access customer master data of the database system for processing one of the ad-hoc queries.

4. The event processing system of claim 1, wherein the event state stores comprise a distributed main-memory based key-value store.

5. The event processing system of claim 1, wherein the event computing nodes are configured to handle rules and continuous queries for complex event processing at the same time as the event processing in real-time.

6. The event processing system of claim 1, wherein the event load balancing device is further configured to route the stream of events based on application-defined partitioning, and wherein the application-defined partitioning comprises a customer key and a rule replication.

7. The event processing system of claim 6, wherein an event computing node of the event computing nodes handles a particular subset of the stream of events and processes all rules on the particular subset of the stream of events.

8. The event processing system of claim 1, wherein the event load balancing device is further configured to route the stream of events based on event replication and rule partitioning, and wherein every event computing node handles all events and a sub-set of rules.

9. The event processing system of claim 1, wherein the event load balancing device is further configured to route the stream of events based on round-robin partitioning of the stream of events and replication of rules, and wherein an event computing node of the event computing nodes handles an event when the event computing node has free capacity.

10. The event processing system of claim 1, wherein the event load balancing device is further configured to route the stream of events based on partitioning and replication of the stream of events and rules through the event computing nodes.

11. The event processing system of claim 1, further comprising a real-time decision sub-system comprising a stream and event processing (SEP) system and the RTA system.

12. A method for event processing comprising:
routing a stream of events to a plurality of event computing nodes according to an event load balancing criteria to enable the event computing nodes to process the stream of events and change their states based on processing of the events;
storing states of the event computing nodes in a plurality of event state stores that are updated by the event computing nodes to maintain a state of the event processing;
processing the stream of events in the event computing nodes;
changing the states of the event computing nodes based on the processing of the events;
updating, based on changing the states of the event computing nodes, the states of the event computing nodes stored in the event state stores;
routing a stream of ad-hoc queries to a plurality of query processing nodes according to a query load balancing criteria;
accessing at least one event state store of the event state stores to process an ad-hoc query of the ad-hoc queries; and
handling the ad-hoc queries for real-time analytics, wherein a real-time analytics (RTA) system is used to directly access the event state stores and handle the ad-hoc queries for the real-time analytics.

13. A non-transitory computer readable storage medium storing program code thereon for use by a computer, that when executed by a processor of the computer causes the computer to:
route a stream of events to a plurality of event computing nodes according to an event load balancing criteria to enable the event computing nodes to process the stream of events and change their states based on the processing of the stream of events;
store states of the event computing nodes in a plurality of event state stores that are separated from and updated by the event computing nodes;
process the stream of events in the event computing nodes to:
change states of the event computing nodes based on the processing of the stream of events; and
update, based on the changed states of the event computing nodes, the states of the event computing nodes stored in the event state stores;
route a stream of ad-hoc queries to a plurality of query processing nodes according to a query load balancing criteria;
access at least one event state store of the event state stores to process an ad-hoc query of the ad-hoc queries; and
handle the ad-hoc queries for real-time analytics, wherein a real-time analytics (RTA) system is used to directly access the event state stores and handle the ad-hoc queries for the real-time analytics.

14. The method of claim 12, wherein the event state stores comprises a distributed main-memory based key-value store.

15. The method of claim 12, further comprising handling, by the event computing nodes, rules and continuous queries for complex event processing at the same time as the event processing in real-time.

16. The method of claim 12, further comprising routing, by an event load balancer, the stream of events based on application-defined partitioning, wherein the application-defined partitioning comprises a customer key, and rule replication.

17. The method of claim 16, wherein an event computing node of the plurality of event computing nodes handles a particular subset of the events and processes all rules on the particular subset of the events.

18. The method of claim 12, wherein routing the stream of events includes routing the stream of events based on event replication and rule partitioning, and wherein every event computing node handles all events and a sub-set of rules.

19. The event processing system of claim 1, wherein the event computing nodes are configured to:
process the stream of events received from the event load balancing device;
change their states based on the processing of the stream of events; and
update the event state stores to store updated states of the stream of events based on changed states of the event computing nodes.

20. The non-transitory computer readable storage medium of claim 13, wherein the processor of the computer further causes the computer to forward each of the ad-hoc queries to exactly one query processing node.

* * * * *